United States Patent [19]

Reed

[11] Patent Number: 4,486,934
[45] Date of Patent: Dec. 11, 1984

[54] MONOLITH EXTRUSION DIE CONSTRUCTION METHOD

[75] Inventor: James R. Reed, Flint, Mich.

[73] Assignee: General Motors Corporation, Detroit, Mich.

[21] Appl. No.: 338,434

[22] Filed: Jan. 11, 1982

[51] Int. Cl.³ .......................................... B23P 15/16
[52] U.S. Cl. ................................. 29/163.5 R; 29/445; 29/558; 76/107 R; 228/161; 228/170; 264/177 R; 425/462; 425/464
[58] Field of Search ............... 29/558, 163.5 R, 445, 29/163.5 F; 76/107 R, 107 S; 264/177 R; 425/464, 465, 466, 467, 462, 461, 463; 228/175, 161, 170

[56] References Cited

U.S. PATENT DOCUMENTS

| | | | |
|---|---|---|---|
| 2,134,146 | 10/1938 | Raisch | 29/163.5 R X |
| 3,283,616 | 11/1966 | Balcenik et al. | 76/107 S |
| 3,790,654 | 2/1974 | Bagley | 264/177 R |
| 4,118,456 | 10/1978 | Blanding et al. | 425/464 X |
| 4,163,640 | 8/1979 | Higuchi et al. | 425/466 |
| 4,235,583 | 11/1980 | Reed | 425/464 |
| 4,242,075 | 12/1980 | Higuchi et al. | 425/462 |
| 4,290,743 | 9/1981 | Suzuki | 425/464 X |
| 4,321,025 | 3/1982 | Cunningham | 425/466 X |
| 4,354,820 | 10/1982 | Yamamoto | 29/558 X |
| 4,373,895 | 2/1983 | Yamamoto | 29/558 X |

*Primary Examiner*—Charlie T. Moon
*Attorney, Agent, or Firm*—George A. Grove

[57] ABSTRACT

In accordance with a preferred embodiment, a monolith extrusion die is formed by separately drilling matching feed holes for extruded material in each of two plates. In one plate the feed holes are shallow and carefully drilled for accurate alignment with the extrusion slots of the die. In the other plate, the holes are accurately located at the drill entry point, but thereafter rapidly drilled without regard to drift. The plates are then bonded together to form my die.

Other methods of forming an extrusion die using two plates are disclosed.

1 Claim, 6 Drawing Figures

MONOLITH EXTRUSION DIE CONSTRUCTION METHOD

This invention relates to a method of making extrusion dies for ceramic materials or the like. More particularly, it relates to a method of making extrusion dies of the type used in making ceramic monolythic honeycomb articles, such as those used in the catalytic treatment of automotive exhaust gases.

BACKGROUND OF THE INVENTION

Monolithic bodies having longitudinal through passages are produced by forcing an extrudable plastic mixture of ceramic precursor materials through interconnecting die passages in which the material is shaped and coalesced into a structure of intersecting, relatively thin walls that define the passages. In one application the extrudable material is a mixture of materials, such as clay, talc and alumina, that can be fired to form cordierite or other heat resistant ceramic. Ceramic honeycomb-shaped monoliths formed of cordierite have been coated with suitable catalysts and catalyst support materials and used in the treatment of automobile exhaust gases. Ceramic honeycomb-shaped bodies are also being considered for use as particulate traps in diesel engine exhaust systems.

In one preferred method of extruding such monolith bodies a plate or disc extrusion die member is used. Feed holes for the extrudable material are provided in one face of the die and a network of intersecting slots are formed in the opposite face. The feed holes lead to and intersect the slots so that the material being extruded can be forced into the feed holes at the upstream side of the die and caused to flow into the die slots. The slots are arranged and sized so that the material spreads and coalesces therein into a unitary, relatively thin-walled honeycomb structure defined by the die slots. The extrudate emerges from the discharge side of the die as a long, unfired ("green") body. The body is cut into suitable lengths, dried and fired to produce a durable, monolithic honeycomb body.

Viewed on end, the body has a number of through passages defined by walls. The cross-section of the passages may be square, triangular, rectangular, or the like, depending on the slot arrangement in the extrusion die. Applications for such bodies have led to efforts to produce more, and thus smaller, passages per square inch of the body's cross-section. This has resulted in thinner walls and has required refinements in the technique of making the dies.

Briefly stated, the die can be produced by starting with a plate of clean, strong, machinable metal, such as, e.g., brass or steel. The plate must be sufficiently thick to withstand extrusion pressures even though it is perforated with many feed holes and discharge slots. The thin slots must be deep enough so the extrudable material flows laterally while flowing downstream. The lateral flow is necessary to completely fill out the walls of the extruded structure by the time the extrudate leaves the die. The extrudable material is delivered to the slots by means of many relatively small diameter feed holes drilled or otherwise suitably formed from the opposite side of the die plate. Each hole must precisely intersect a slot, forming a relatively unimpeded flow junction therewith. Usually the feed holes are located so that each terminates at a point of intersection of two slots.

Monolithic structures having 100 to 600 or more cells per square inch are now produced. The cell walls of such structures are quite thin, typically less than 0.010 inch. The intersections of the die slots are necessarily quite close together. As a result, the feed holes are small in diameter and closely spaced.

It has proven difficult to economically drill a large number of small feed holes located with sufficient accuracy to precisely intersect the extrusion slots in the die. Small diameter drill bits drift laterally as they penetrate the metal. Even a small displacement results in misalignment between a feed hole and a die slot. An exemplary die plate may be about one inch thick with feed holes about $\frac{3}{4}$ inch deep. if the feed holes are located on 0.100 inch centers and must intersect a slot about 0.010 inch in width, it does not take much lateral movement of the drill bit in penetrating to a depth of $\frac{3}{4}$ inch to partly miss the slot.

OBJECTS OF THE INVENTION

It is an object of this invention to provide a method of producing monolith extrusion dies at relatively low cost while retaining the strength of a relatively thick die and obtaining accurate alignment between corresponding feed holes and die slots.

It is a more specific object of this invention to provide such a method of making monolith extrusion dies using two plates that will ultimately be joined in forming the die structure. In a preferred embodiment I drill precisely located holes into both plates to form feed holes, bond the plates together at their drill entry surfaces and form die slots. In another embodiment holes are drilled in only one of the two plates and slots are cut clear through the second plate after bonding.

BRIEF SUMMARY OF THE INVENTION

In accordance with a preferred embodiment of my invention, these and other objects and advantages are accomplished as follows. A series of shallow, precisely located feed holes are drilled into one flat surface of a first plate. The depth of these holes typically may be of the order of 0.1 inch. The holes can be drilled rapidly and straight to this depth. A matching series of like accurately located holes is then rapidly drilled through a second steel plate. The thickness of this second plate and the depth of the holes can suitably be of the order of $\frac{1}{2}$ to $\frac{3}{4}$ inch as required for die strength. Although the entry points of the drill must be accurately located to match the locations of the holes drilled in the first plate, thereafter drift can be accommodated as the holes are rapidly bored through the second plate.

The plates are annealed to relieve machining stresses and the drill entry surfaces of the two plates are then ground flat if necessary. The plates are placed together with the drill entry surfaces face to face, and a suitable bonding material, such as a braze alloy, interposed. The plates are thus bonded together. Feed holes for extrudable material now extend from one side deep into the body of the plate. Extrusion slots are cut into the opposite side of the plate with the confidence that the end of each feed hole will be accurately located and will properly align with the intended slot.

Variations of the above described two-plate extrusion die making process are as follows.

Accurately located feed holes are drilled through one plate. An undrilled plate is bonded to the drill entry surface of the through-drilled plate. The undrilled plate is of the thickness of the desired die slots or the plate is machined to that thickness after bonding. Slots are then machined to intersect the feed holes. The bond joint would be at the base of each slot defining pin. This method eliminates the shallow drilling of the slot plate.

In still another embodiment, feed holes are drilled through one plate as described above. Die slots are machined only part way through the second plate. Their intersections are located to match the holes in the first plate. The grid pins thus formed are held in place by the uncut metal of the second plate. The grid pin side of the second plate is bonded to the drill entry side of the first plate. The remaining metal is removed after bonding to leave the grid attached to the feed hole plate.

Other objects and advantages of my invention will be more fully understood from a detailed description thereof which follows. Reference will be had to the drawings in which.

DETAILED DESCRIPTION OF THE INVENTION

Figure 1:
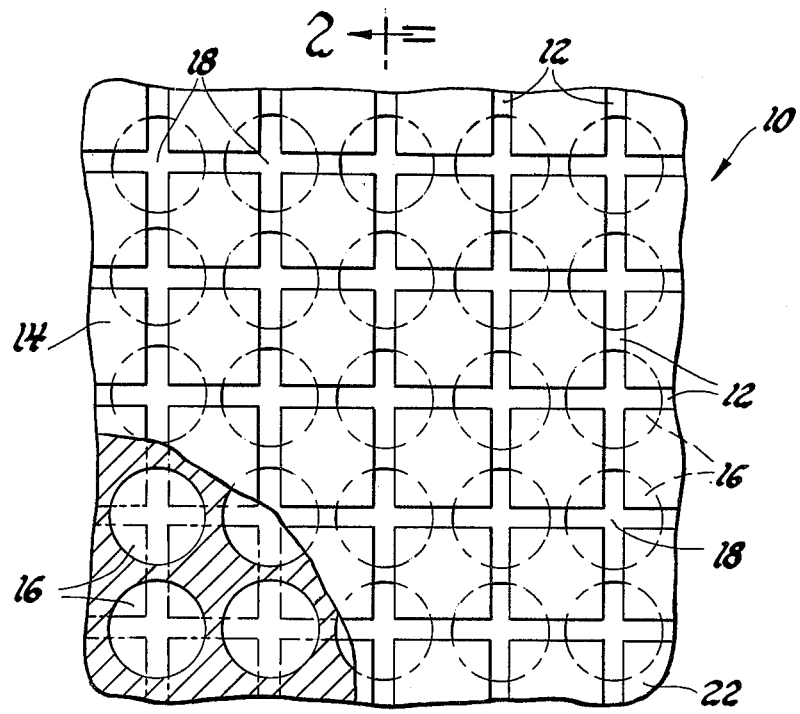
FIG. 1 is an enlarged plan view of a monolith extrusion die, with portions of the die broken away to illustrate both the extrusion slots and the feed holes.
Figure 2:
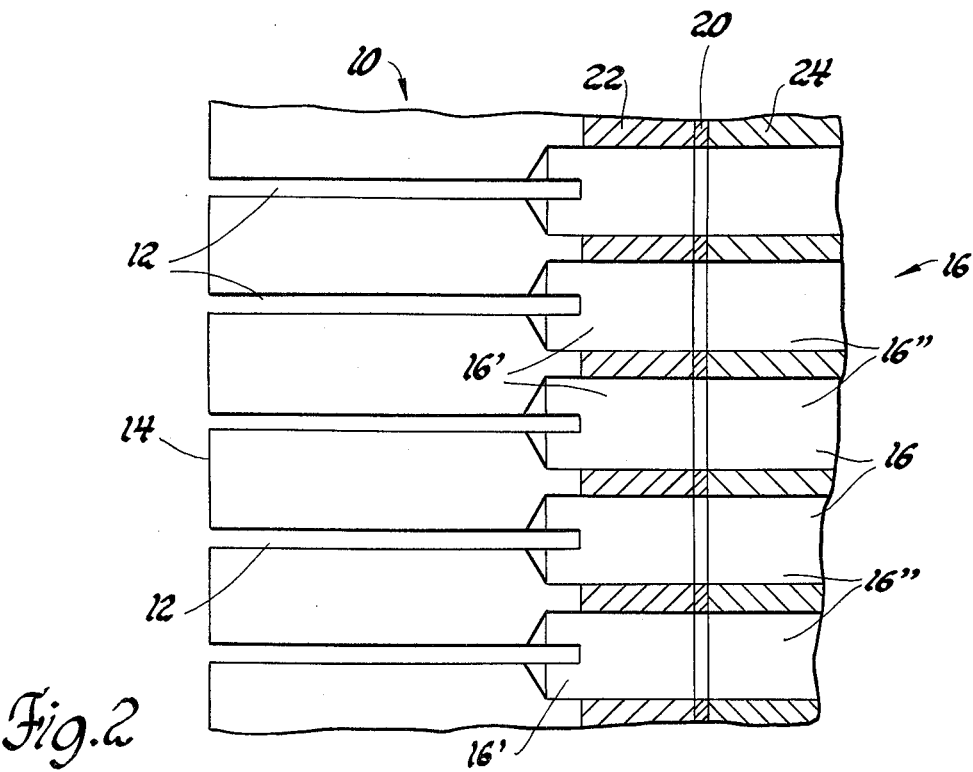
FIG. 2 is an enlarged sectional view of the die of FIG. 1 made in accordance with my method, illustrating the two-plate region of the die and the intersection of a number of feed holes with slots.

Referring to FIG. 1, a portion of a representative monolith extrusion die is depicted generally at 10 and is seen to include a series of intersecting slots 12 forming a square grid which shapes the extrudate into a honeycomb monolith structure. In FIG. 1 the die is viewed from its downstream or discharge face 14. Slots 12 extend from discharge face 14 part way through the die. Upstream of slots 12 are feed holes 16 for extrudable material. In the embodiment shown there is a feed hole 16 intersecting each slot intersection 18. It will be appreciated that there could be other die arrangements in which feed holes are employed only at every other slot intersection. Preferably the feed holes 16 are accurately aligned with the slot intersection 18 to most effectively introduce extruded material into the extrusion slots of the die. As seen in FIG. 2, the feed holes 16 may be formed to a depth so that they overlap the slots 14, thereby increasing the area of intersection between a slot and corresponding feed hole, facilitating the flow of extrudable material from the hole into the slot. Also shown in FIG. 2 is a portion of the brazed interface 20 between the two plates 22, 24 employed in manufacturing the die. This aspect of the invention will be described in more detail below. However, it should be understood that the size of the braze region is enlarged in FIG. 2 for illustration. It is to be understood that the portion of the feed hole 16' intersecting the slot has been formed in the first plate and is a relatively shallow hole constituting only a minor portion of the total depth of the feed hole.

Figure 3:
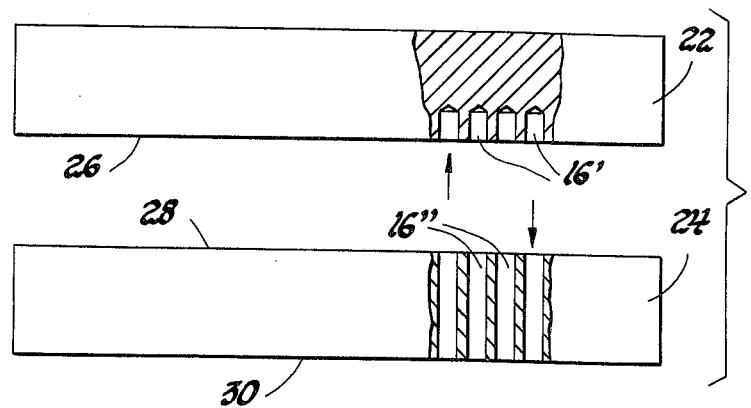
FIG. 3 illustrates a first step in the practice of my method, showing the drilling of the feed holes in the two plates, with parts of the plates broken away.

At least two plates, preferably annealed steel plates, are employed in the practice of my method. As illustrated in FIG. 3, a series of shallow holes 16' are drilled part way into one side of a first plate 22. For example, the holes may be drilled in the pattern of a square grid on 0.100 inch centers. This would provide about 100 holes per square inch. The holes may be drilled to a depth of about 0.1 inch. Matching holes 16'' arranged in an identical pattern are drilled completely through a second plate 24. As long as the entry points of the drills are precisely located, the holes may be rapidly drilled without regard to drill drift. The drill entry sides (26, 28) of the plates are indicated by the arrows in FIG. 3. Consistent with this example, the diameter of the holes in each set is nominally 0.076 inch.

Figure 4:
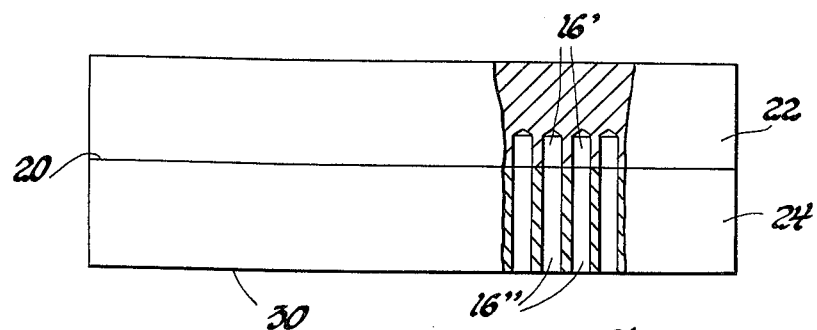
FIG. 4 illustrates another step in the practice of my method in which the two plates are bonded together with the feed holes aligned.

The two drilled plates are then annealed. The drill entry side of each of the plates is ground just enough to make them flat, if necessary. The two plates are then assembled with the drill entry surfaces in face to face relationship, and the drill holes aligned. See FIG. 4. A brazing or solder foil is placed between the plates. For example a thin strip, approximately 0.002 inch thick, of oxygen free, high conductivity copper may be used. The assembly is then heated in a vacuum furnace to produce a copper brazed joint 20. Dowel pins (not shown) may be used to maintain proper alignment before the braze bond is obtained.

Figure 5:
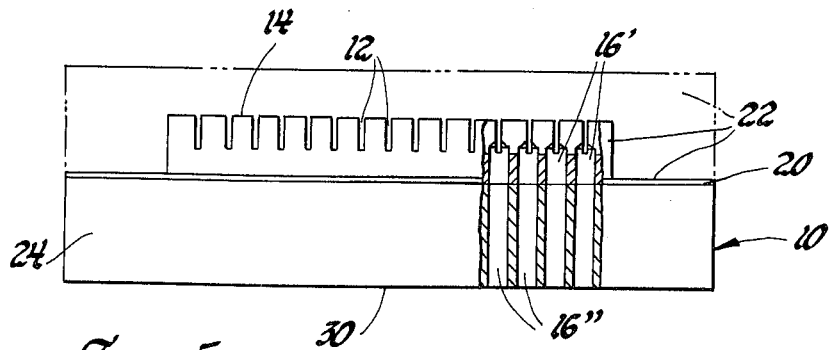
FIG. 5 illustrates still another step in the practice of my method in which excess material is removed from one of the original plates, and slots are formed in the remaining material to complete the construction of the die.

At this point of the process, excess metal, if any, may be removed from the first plate 22. As depicted in FIG. 5, the material is removed (indicated by skeleton outline) until just the slot region of the final die is defined. Enough metal is left at the margin of the first plate 22 to retain a strong brazed joint 20. The thickness of the original first plate need then be no greater than the depth of the slot 14 plus the depth of the shallow feed holes 16'. By way of example, the slots 12 may be about $\frac{1}{4}$ inch in depth in a square pattern on 0.100 inch centers. The slots 12 themselves may be typically about 1/60 inch in width. The slots are cut into the surface of the downstream side 14 of the die plate 22 by any suitable means. For example, electrodischarge machining may be employed for this purpose. One preferred practice is to initially cut the slots oversize and then plate them with nickel or other wear resistant material to size.

This completes the construction of a quality die for monolith extrusion. It is apparent that the principal thickness and strength of the die is provided by the second plate 24 as described above in the practice of my method. The holes, although initially located very accurately, may be rapidly drilled without concern for drift. The drill exit side 30 of plate 24 becomes the upstream or feed side of the die 10. There the precise location of feed holes 16 is not critical. The critical region at the junction of the feed hole 16 and the slot 12 is formed in the first die plate 22. There the holes are shallow and precisely drilled either before or after the slots are formed. Preferably, as illustrated in FIG. 2, there is an overlap in the depth of the slot and feed holes (for example, 0.030 inch) to increase the area in which the extruded material can flow from a feed hole into the slot.

My method is particularly applicable when the feed holes are mechanically drilled. However, it will be appreciated that the holes may be formed by other suitable methods, such as electrodischarge machining or laser or electron beam drilling.

My two-plate method of forming a monolith extrusion die may take other forms and provide other advantages.

For example, in another embodiment of my invention I form accurately located holes clear through a first plate. Again, the important feature is that the holes be accurately located at one side of the plate and the drill or other hole forming means may be allowed to drift as the hole is formed through the plate. In this embodiment the thickness of this first plate should be equivalent to the desired depth of the feed holes. A second plate that is undrilled, is bonded to the first plate against the drill entry side of the first plate. The thickness of this undrilled plate is preferably equivalent to the desired depth of the slots in the final die. If the plate is thicker, the second plate is machined down to a dimension equivalent to the desired depth of the slots after bonding. Slots are then formed in the second die from the outer surface to intersect the holes. Obviously, the bond joint is at the base of the grid pins that remain after the slots are formed. This method would eliminate the shallow drilling of the slot plate.

If in the practice of this embodiment it is desired to have an overlap between the slot and feed hole as illustrated in FIG. 2, shallow slots may be formed in the through-drilled plate prior to bonding. Alternatively, when the slots are machined in the undrilled plate the depth may exceed the thickness of the plate so that the slots penetrate the feed hole to a desired overlap depth.

Figure 6:
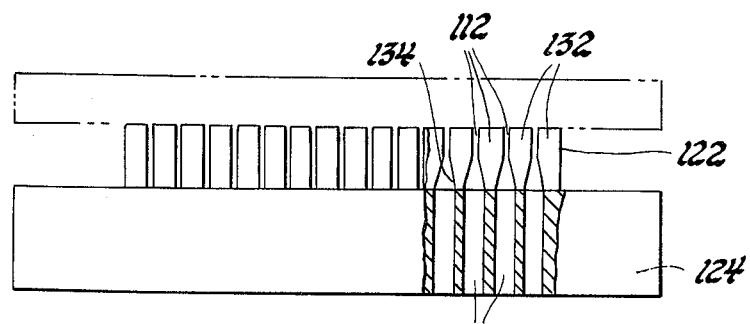
FIG. 6 illustrates another embodiment of the invention.

Still another embodiment of the practice of my invention is illustrated in FIG. 6. Accurately located feed holes 116 are drilled completely through a first plate 124. The drill entry surface of plate 124 is at its upper surface. A series of intersecting slots are then machined part way through a second plate. The intersection of the slots are carefully located to match the locations of feed holes 116. The slotted side of the second plate is then bonded to the drill entry side of the first plate with the slot intersections and drill holes aligned. FIG. 6 illustrates the position of the plates in their bonded position. The slot plate is indicated 122 with slots 112. The residual metal of the second plate is then machined away as indicated by the skeleton lines in FIG. 6. This leaves individual grid pins 132 bonded in place to feed hole plate 124. The advantage of this embodiment is that the slots at their feed hole end may be provided with a taper 134 or other desired shape to increase the area of intersection with a feed hole. This facilitates the flow of extrusion material from the feed hole portion of the die into the grid of intersecting slots.

Thus it will be appreciated that my two-plate method of making monolith extrusion dies having accurately aligned feed hole and extrusion slots may take any of several related but slightly different forms. In my preferred embodiment I form matching holes in each of two die plates before the plates are joined together. In one plate the holes are shallow and in the other plate the holes are drilled completely through its thickness. Slots are formed in the plate with the shallow holes preferably after the plates have been bonded together. In other embodiments of my invention the holes are drilled in only one of the two plates and then completely through that plate. The slots are formed in the second plate either before or after it is bonded to the drill plate. Tapered or other slot configurations can be produced. Proper grid hole alignment with the slot intersections can be inspected before the plates are bonded together.

The practice of my invention permits the economic manufacture of strong monolith extrusion dies which in turn permits the use of higher extrusion pressures.

While my invention has been described in terms of certain preferred embodiments thereof, it will be appreciated that other forms could readily be adapted by one skilled in the art. Accordingly, the scope of my invention is to be considered limited only by the following claims.

The embodiments of the invention in which an exclusive property or privilege is claimed are defined as follows:

1. A method of making a die plate for extruding honeycomb structures, said plate having sufficient thickness to withstand extrusion pressures and a plurality of extrudable material feed holes leading from the feed side of said die plate to intersecting die slots in the opposite discharge side of the plate, said slots defining the grid of said honeycomb, said method comprising drilling a first set of feed holes into a first die plate, said holes being precisely located for introducing extrudable material into discharge slots to be formed in the opposite side of said plate, said holes being of shallow depth such that drill drift does not affect the accuracy of the intersection of a said hole with one or more said slots, drilling a matching set of feed holes through a second die plate, the thickness of said die plate being as required to provide strength to said extrusion die without concern for feed hole drill drift, the location of said holes at the drill entry side of said second plate precisely corresponding to the location of said holes in said first plate, bonding the two die plates together with the drill entry surfaces thereof in face to face relationship and with said holes in alignment to form a unitary plate, and thereafter forming a grid of interconnected discharge slots in the unitary plate in the side opposite said feed holes and accurately intersected by said holes.

* * * * *